(12) United States Patent
Kummeth

(10) Patent No.: US 7,256,523 B2
(45) Date of Patent: Aug. 14, 2007

(54) MAGNETIC MOUNTING OF A ROTOR SHAFT RELATIVE TO A STATOR, USING A HIGH-$T_c$ SUPERCONDUCTOR

(75) Inventor: Peter Kummeth, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 614 days.

(21) Appl. No.: 10/289,217

(22) Filed: Nov. 7, 2002

(65) Prior Publication Data
US 2005/0127765 A1 Jun. 16, 2005

(30) Foreign Application Priority Data
Nov. 7, 2001 (DE) ................ 101 54 537

(51) Int. Cl.
*H02K 7/09* (2006.01)
(52) U.S. Cl. .................................. 310/90.5
(58) Field of Classification Search .......... 310/52, 310/54, 90.5, 90
See application file for complete search history.

(56) References Cited

U.S. PATENT DOCUMENTS

| | | | | |
|---|---|---|---|---|
| 3,242,418 A | * | 3/1966 | Mela et al. | 322/28 |
| 3,731,865 A | * | 5/1973 | Wood | 277/365 |
| 3,991,588 A | * | 11/1976 | Laskaris | 62/50.7 |
| 4,486,026 A | * | 12/1984 | Furumura et al. | 277/400 |
| 4,523,896 A | | 6/1985 | Lhenry et al. | |
| 4,862,023 A | | 8/1989 | Laumond et al. | |
| 5,030,863 A | * | 7/1991 | Yoshimura et al. | 310/52 |
| 5,047,392 A | * | 9/1991 | Hed | 505/165 |
| 5,052,697 A | * | 10/1991 | Ishikawa | 277/410 |
| 5,102,237 A | * | 4/1992 | Ide | 384/224 |
| 5,341,059 A | * | 8/1994 | Fukuyama et al. | 310/90.5 |
| 5,710,469 A | * | 1/1998 | Ries | 310/90.5 |
| 5,763,971 A | * | 6/1998 | Takahata et al. | 310/90.5 |
| 6,221,813 B1 | * | 4/2001 | Riedel et al. | 505/432 |
| 6,711,422 B2 | * | 3/2004 | Mawardi | 505/166 |
| 6,762,522 B2 | * | 7/2004 | Steinmeyer | 310/90.5 |
| 6,777,841 B2 | * | 8/2004 | Steinmeyer | 310/90.5 |
| 2004/0021382 A1 | * | 2/2004 | Steinmeyer | 310/90.5 |

FOREIGN PATENT DOCUMENTS

| | | | |
|---|---|---|---|
| DE | 33 19 112 | | 12/1983 |
| DE | 44 36 831 | | 6/1995 |
| DE | 44 44 587 A1 | | 6/1996 |
| JP | 59159469 A | * | 9/1984 |
| JP | 02106144 A | * | 4/1990 |
| JP | 6-101715 | | 4/1994 |
| JP | 111 41 560 | | 5/1999 |
| WO | WO 0231371 | * | 4/2002 |

* cited by examiner

*Primary Examiner*—Dang Le
(74) *Attorney, Agent, or Firm*—Staas & Halsey LLP

(57) ABSTRACT

A first bearing part is arranged fixedly in terms of rotation on a rotor shaft with permanent magnetic elements arranged next to one another and flux guide elements arranged between them. A second bearing part, separated from the first bearing part by a bearing gap, is provided on the stator and has a structure formed of superconductive high-$T_c$ material. The bearing gap is sealed against penetration of ambient air, but allows movement of the first bearing part with respect to the second bearing part while maintaining the seal.

13 Claims, 2 Drawing Sheets

MAGNETIC MOUNTING OF A ROTOR SHAFT RELATIVE TO A STATOR, USING A HIGH-$T_c$ SUPERCONDUCTOR

CROSS REFERENCE TO RELATED APPLICATIONS

This application is based on and hereby claims priority to German Application No. 101 54 537.1 filed on Nov. 7, 2001, the contents of which are hereby incorporated by reference.

BACKGROUND OF THE INVENTION

1. Field of the Invention

The invention relates to a magnetic mounting of a rotor shaft relative to a stator and, more particularly, to a magnetic mounting using a high-$T_c$ superconductor.

2. Description of the Related Art

Magnetic mountings of this type serve for the largely loss-free mounting of a rotor shaft relative to a stator. One possible application is, for example, the mounting of a motor shaft. When such a magnetic bearing is in operation, the superconductor is cooled to a temperature of approximately 77 K, for example using liquid nitrogen or by a refrigerating machine. The permanent-magnetic elements provided on the rotor shaft and the flux guide elements of the arrangement located on the rotor-shaft side are also cooled to temperatures of approximately 77 K via the small spacing relative to the superconducting structure, the bearing gap which spaces the two arrangements apart having a width of only 1.5 mm. If, then, ambient air has unimpeded access to the bearing gap, the air moisture contained in the ambient air will freeze out of the air in the bearing gap on the cold bearing parts and the bearing gap will therefore be narrowed by ice. The bearing gap thus freezes shut in the course of time.

In order to counteract this, it is known, for example, to introduce dry gaseous nitrogen into the bearing gap. The throughflow or scavenging of the bearing gap with dry nitrogen which is induced thereby prevents moist air from penetrating into the bearing gap. This has the disadvantage, however, of a relatively high outlay in terms of apparatus and the consumption of scavenging gas.

SUMMARY OF THE INVENTION

An aspect of the invention is to provide a mounting which is improved in comparison with the related art described above.

To attain this aspect in a mounting of the type initially mentioned, according to the invention the bearing gap is sealed off against penetration of ambient air, while allowing movement of the first bearing part with respect to the second bearing part.

The invention proposes, in a mounting, to carry out a genuine sealing-off of the bearing gap, using suitable a suitable seal, to prevent ex-factory penetration of ambient air into the bearing gap. According to the invention, however, the seal allows movement of the two bearing parts in relation to one another. In the case of a magnetic mounting of the type in question, after the assembly of all the components, it is necessary, for "commissioning" the mounting, to raise the rotor shaft and consequently the first bearing part and move it in relation to the second bearing part which is provided on the stator side and is stationary, the two bearing parts even being capable of touching one another. In this case, the rotor shaft is to be raised by a maximum of the width of the bearing gap, that is to say approximately 1.5 mm. After the superconductive state is reached, with sufficient cooling, currents can flow, free of loss, in the superconductive structure. The lowering of the rotor shaft due to its own weight induces currents in the superconductive structure owing to the adjacent permanent-magnetic elements. The interaction of the magnetic field thus generated with the field of the permanent magnets carries the rotor shaft in a contact-free manner. So that, during this action which it is absolutely necessary to carry out, the situation is avoided where ambient air penetrates and the disadvantages initially mentioned may therefore arise, the seal used is designed to allow or compensate for this movement, without losing sealing properties.

In this context, the seal may be designed as annular sealing elements forming sealing means which seal off either directly in relation to the rotor shaft or else in relation to the first bearing part which is fastened fixedly in terms of rotation on the rotor shaft. On the other side, of course, the sealing elements seal off in relation to the stator or in relation to the second bearing part.

In a first embodiment of the invention, there may be provision for the annular sealing elements to have a sufficient inherent elasticity allowing the movement of the first bearing part with respect to the second bearing part. That is to say, the sealing elements used can be deformed within the scope of the very short movement without any loss of their sealing properties.

Alternatively to this, there may be provision for the annular sealing elements to be held on the stator housing at a portion which has sufficient elasticity. In this embodiment of the invention, therefore, the necessary moveability of the sealing elements is implemented via a corresponding elastic and consequently moveable or deformable bearing portion or holding portion for the sealing elements on the stator housing. For this purpose, for example, an elastic housing portion which runs essentially parallel to the rotor shaft and is essentially tubular on account of the annular design of the sealing elements may be provided on the stator housing on both sides of the bearing gap. This portion may be designed, for example, in the form of a corrugated-tube or corrugated-hose portion, that is to say in a concertina-like manner. It is important, in any event, that it has a radial elasticity and moveability with respect to the rotor shaft. The rotor shaft passing concentrically through the corrugated-tube or corrugated-hose portion and the concentrically arranged annular sealing elements which seal off in relation to the rotor shaft or to the first bearing part, on the one hand, and in relation to the corrugated-tube or corrugated-hose portion, on the other hand, can thus be raised without any problems, in this case only the corrugated-tube or corrugated-hose portion being bent slightly. Sealing-off via the sealing elements is not lost during this.

In a development of the idea of the invention, there may be provision for at least one feed line for a scavenging gas to be provided in the region of the bearing gap. This feed line may be expedient when the sealing means used are not sealing elements sealing off hermetically, but those which have minimal leakage. In this case, the scavenging gas serves merely for briefly scavenging the bearing gap from time to time, that is to say intermittently, since the sealing means prevent too much moist ambient air from penetrating, so that the rise in the moisture content in the bearing gap in relation to time is very small, and therefore scavenging which takes place only now and then is sufficient. In this case, the scavenging gas used should expediently be a dry gas, for example dry nitrogen or dry air. However, the feed line for a scavenging gas is advantageous even when hermetic sealing elements are used. This is because, with increasing cooling, the air present in the bearing gap is also cooled sharply, so that, in this region, a vacuum arises which can be compensated via brief pressure compensation. This may be carried out by a brief opening and immediate closing of the scavenging-gas supply, in which case even ambient air may be used for pressure compensation, since the quantity necessary for pressure compensation is very small and, consequently, the moisture fraction in the bearing gap, even in the case of pressure compensation by ambient air, is very low, so that freezing shut is not possible. One advantage of this pressure compensation is, in particular, that the sealing elements used do not have to withstand any pressure difference resulting from a vacuum in the bearing gap, but merely have to perform their specific sealing action and prevent moist room air from penetrating into and flowing through the bearing gap.

According to the invention, the sealing means or sealing elements used may be any seals known to a person skilled in the art. Lamellar sealing rings, labyrinth sealing rings, radial packing rings or ferrofluidic seals are expedient in this context.

A ferrofluidic seal, which allows a movement of the two bearing parts in relation to one another and does not have to be arranged on an elastic housing portion permitting this moveability with regard to the seal, is distinguished, according to the invention, in that it has a first seal part, which is arranged on the stator side, and a second seal part, which is arranged on the rotor-shaft side, each seal part including an annular permanent-magnetic element with an associated annular flux guide element, the ferrofluid being enclosed in the air gap between the flux guide elements located opposite one another, and, in the event of a movement of the rotor shaft with respect to the stator, the two arrangements being displaceable relative to one another, with the enclosing of the ferrofluid at the same time being maintained. This ferrofluidic seal is distinguished in that its components are of annular design and project radially with respect to the rotor shaft, that is to say the corresponding annular components are arranged axially one behind the other. This arrangement makes it possible in a particularly advantageous way to have a displacement of the two bearing parts with respect to one another, the ferrofluid which ensures sealing remaining enclosed, as before. The permanent-magnetic elements and the flux guide elements of the two seal parts in each case have essentially identical inside and outside diameters. In this case, the width of the overlap area of the flux guide elements which delimits the air gap should be such that, in the event of a maximum displacement of the arrangements in relation to one another, a minimum overlap ensuring the enclosing of the entire ferrofluid remains. The width of the overlap region of the flux guide elements, which, as seen quasi-axially, are arranged mirror-symmetrically to one another, is dimensioned such that, even in the event of a displacement, they overlap one another, as before, in the maximum displacement range, to an extent such as to ensure that the ferrofluid remains enclosed, so that the sealing action is maintained.

To avoid the situation where the two bearing parts of the ferrofluidic seal according to the invention approach one another owing to the magnetic properties, at least one spacer is expediently provided, by which the two arrangements are spaced apart from one another even in the event of a displacement. This spacer may be, for example, a nonpositive bearing allowing a rotation of the two seal parts with respect to one another and which includes a bearing ring which is acted upon by a return force and by which the two seal parts are pressed away from one another.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
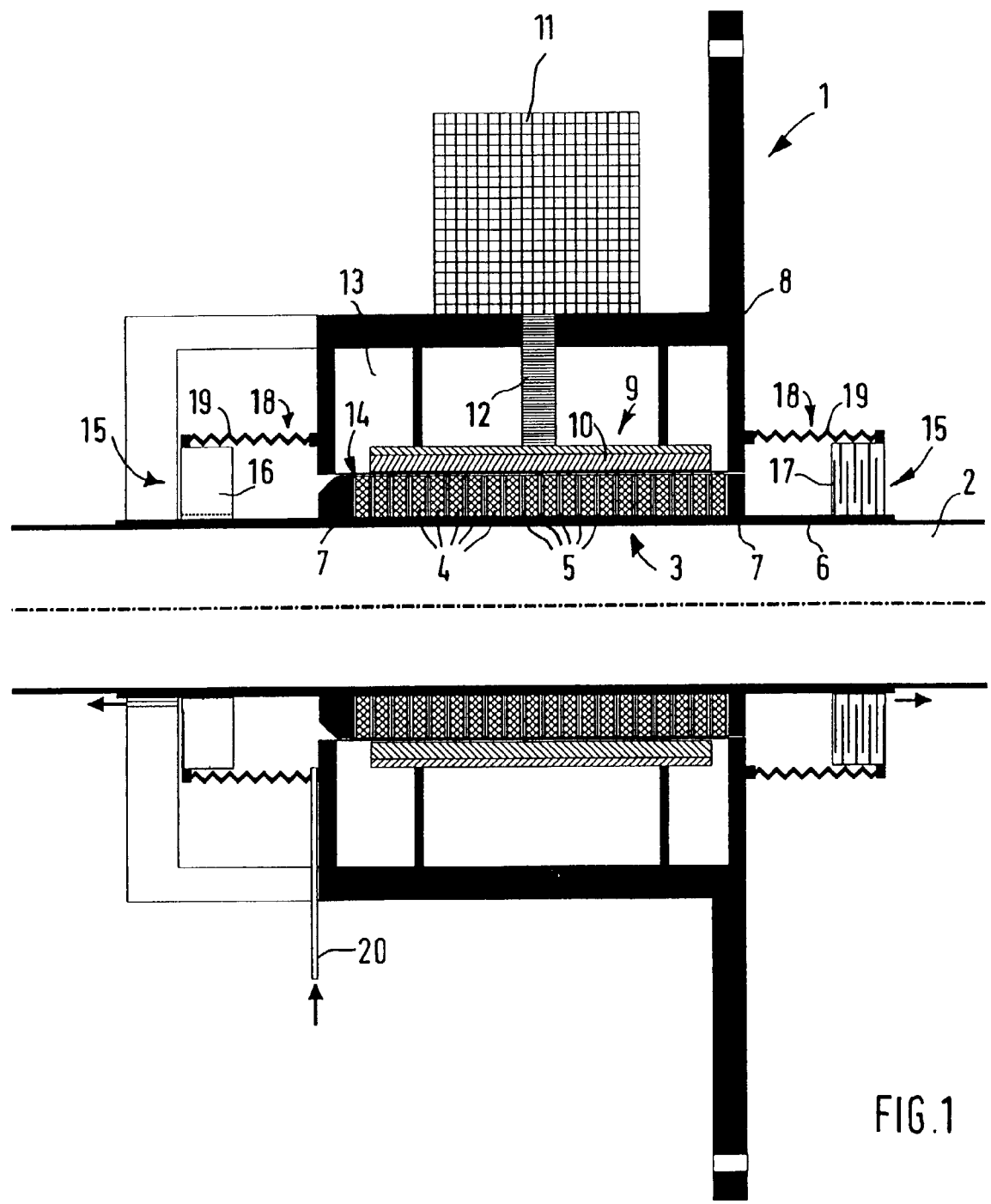
FIG. 1 is a cross section of a first embodiment of a magnetic mounting according to the invention.
Figure 3:
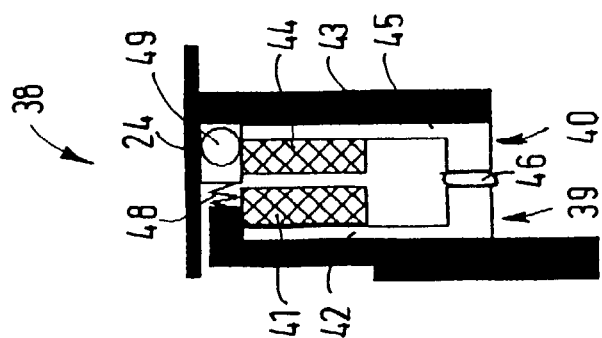
FIG. 3 is an enlarged cross section of a ferrofluidic bearing.

Reference will now be made in detail to the preferred embodiments of the present invention, examples of which are illustrated in the accompanying drawings, wherein like reference numerals refer to like elements throughout.

FIG. 1 shows a first embodiment of a magnetic mounting 1 according to the invention. A first bearing part 3 including a plurality of permanent-magnetic elements 4, with intermediate flux guide pieces 5 which are arranged on a tubular carrier 6, is fastened fixedly in terms of rotation, for example via a stud screw or the like, not shown, to a rotor shaft 2, for example a motor shaft. The permanent-magnetic elements and the flux guide elements are fixed in position via end pieces 7. A second bearing part 9 including a superconductive structure 10 formed of a high-$T_c$ superconductor material (for example, YBCO) is arranged, fixed in position, in a stator housing 8. The superconductive structure is cooled to a temperature of approximately 77K by a cold head 11 via a heat bus 12. The inner space 13 of the stator housing may be filled with an insulating material, for example an insulating foam, or else be designed as a vacuum space.

The two bearing parts 3 and 9 are separated from one another via a narrow bearing gap 14. After the commissioning of the magnetic mounting, the annular bearing gap 14 surrounds the first bearing part 3 on all sides, that is to say the rotor shaft 2 or the bearing part 3 is suspended in the superconductive structure 10, they do not touch one another. The width of the annular bearing gap 14 is between 1 and 2 mm, normally approximately 1.5 mm, the exact dimension depending, of course, on the size of the mounting.

Since, on account of extreme cooling of the superconductive structure 10, the opposite arrangement formed of permanent-magnetic elements 4 and flux guide elements 5 and, of course, the air present in the bearing gap 14, too, are also cooled correspondingly, if there is air moisture present in the bearing gap 14 a freezing-out of the moisture and consequently an icing-up of the bearing gap with increasing operating time may occur. In order to counteract this, two sealing elements 15, which may be sealing means providing different types of seal, are provided on both sides of the bearing gap 14. For example, the sealing means may be designed as a ferrofluidic seal 16, as illustrated in the left part of the figure, while another embodiment is a seal in the form of a labyrinth or lamella seal 17, as illustrated in the right part of the figure. Each seal is annular. As shown in FIG. 1, each annular seal is received in an elastic housing portion 18 which, in the example shown, is a corrugated-tube or corrugated-hose portion 19 which is likewise arranged axially symmetrically and which receives the seals at the edge. The corrugated-tube or corrugated-hose portion 19 is sufficiently flexible, that is to say it is capable of reconstructing and following corresponding movements of the rotor shaft 2. The respective annular sealing elements are fastened in a leaktight manner to the elastic housing portion 18, that is to say they seal off upwardly in relation to this portion. With their lower sealing end, that is to say on their inner wall or at the inside diameter, they seal off in relation to the carrier 6 of the first bearing part 3, the carrier 6 being rotationally moveable with respect to the stationary seals. As is clear, the air gap 14 is outwardly sealed off completely on both sides via the sealing elements 15.

As FIG. 1 also shows in the lower part of the figure, a feed line 20 for a scavenging gas, for example nitrogen or the like, is provided, via which the scavenging gas can be flushed in the region of the air gap 14 and into the region between the sealing elements 15. It is thereby possible to have an intermittent scavenging of the air gap with a moisture-free scavenging gas. The scavenging gas can reemerge via the sealing elements.

If, then, after assembly, the magnetic mounting is to be commissioned, it is necessary to raise the rotor shaft 2, together with the first bearing part 3, so that the first bearing part 3 is led, for example with its upper end, nearer to the superconductive structure, if appropriate until contact is made. The movement travel likewise amounts to between 1 and 2 mm, depending on the width of the width of the resulting bearing gap. The superconductive structure 10 is cooled. After the transition temperature is reached, the superconductive structure changes from its normally conductive state present until then into the superconductive state, after which induced currents can flow, virtually free of loss. By the shaft being lowered, currents are induced in the superconductive structure 10 by virtue of the arrangement of the permanent-magnetic elements and the resulting magnetic fields. The induced currents, in turn, generate a magnetic field which opposes the magnetic field of the permanent-magnetic elements and consequently carries the rotor shaft 2 which is suspended freely in the superconductive structure 10.

By the sealing elements 15 being received in the elastic housing portions 18, the sealing elements 15 are co-moved during the movement of the shaft and the elastic housing portion 18 is deformed somewhat, for example bent upward somewhat, the bend corresponding at most to the movement travel of the rotor shaft 2. That is to say, the sealing action of the sealing elements 15 is maintained even during the shaft movement for raising or lowering.

The sealing means used may be those which seal off hermetically, that is to say no gas exchange between the region within the magnetic mounting and the surroundings is possible via the sealing means. In such a case, the use of the feed line 20 and the use of the scavenging gas may be dispensed with. Nevertheless, even in this case, a design of this kind is expedient, since, during the cooling of the residual air present between the sealing elements 15, a vacuum arises which acts on the sealing elements 15. Thus, by brief opening and closing, pressure compensation can be carried out via the feed line 20, so that the sealing elements 15 do not have to withstand any pressure difference, but merely have to prevent the penetration of room air or ambient air into the region toward the bearing gap 14.

If the sealing elements 15 are those which do not seal off hermetically, an intermittent supply of scavenging gas is possible via the feed line 20, in order to scavenge the bearing gap 14 or the inner space between the sealing elements 15 with moisture-free air from time to time. Via the sealing elements 15, a penetration of moist ambient air is avoided as far as possible or is prevented to an extent such that the moisture content rises only very slowly with the operating time, so that scavenging at relatively ample intervals is possible without the risk of icing up.

Figure 2:
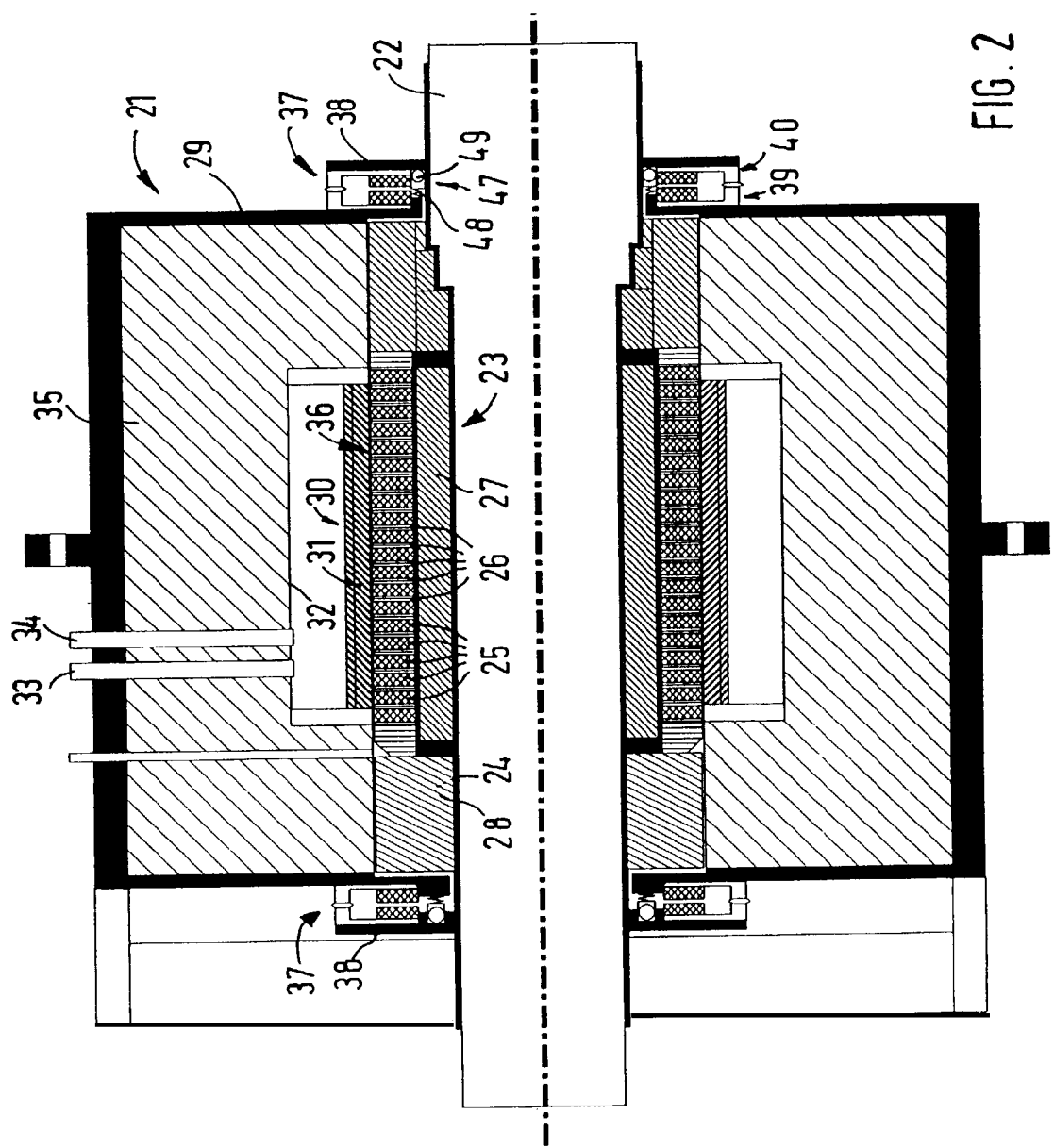
FIG. 2 is a cross section of a second embodiment of a magnetic mounting according to the invention.

FIG. 2 shows a further embodiment of a magnetic mounting 21 according to the invention. Here, too, the rotor shaft 22 has provided on it a first bearing part 23 including a plurality of permanent-magnetic elements 25 arranged on a tube-like carrier 24 and having intermediate flux guide elements 26, the tube-like carrier 24 having provided on it a chamber which is filled with an insulating material 27 and via which a passage of heat from the rotor shaft, which is at room temperature, to the permanent-magnetic elements and the flux guide elements is avoided. The first bearing part 1 has, furthermore, a foam insulation 28 on both sides.

Provided in a stator housing 29 is a second bearing part 30 including a superconductive structure 31 arranged in a cryogenic vessel 32 which is filled with liquid nitrogen and which can be filled with liquid nitrogen via feed and discharge lines 33, 34. The first bearing part or the cryogenic vessel 32 is received in a foam insulation 35.

Here, too, the two bearing parts 23, 30 are separated from one another via a narrow bearing gap 36. To seal off the bearing gap outwardly, sealing elements 37 are provided here, too, formed of a ferrofluidic seal 38. The first seal part 39 is fixedly arranged on the stator housing 29 on the stator side and includes an annular permanent-magnetic element 41 and a flux guide element 42, likewise of annular design, which is connected to the latter. Both project radially with respect to the rotor shaft, an axial edge projection being provided on the flux guide element. The second seal part 40 is fastened to a radially projecting collar 43 located on the rotor-shaft side and likewise includes an annular permanent-magnetic element 44 and a flux guide element 45 which have the same dimensions as the parts of the first seal element, so that the permanent-magnetic elements 41, 44 are located directly opposite one another. The same applies correspondingly to the flux guide elements 42, 45, these being arranged in such a way that the axial edge portions point toward one another. A ferrofluid 46, which achieves sealing, is enclosed between these portions.

As is clear, the two seal parts 39, 40 are rotationally moveable with respect to one another, the first seal part 39 being stationary and the second seal part 40 being moved with respect to the first seal part. The axial portions of the flux guide elements 42, 45 move past one another, the ferrofluid 46 remaining enclosed between them during this movement.

By virtue of the axially symmetric construction of the ferrofluidic seal 38, it is possible to raise the rotor shaft 22 and, with it, the second seal part 40, so that the second seal part 40 is displaced with respect to the stationary first seal part 39. At the same time, those axial portions of the flux guide elements 42, 45 which enclose the ferrofluid 46 are also displaced with respect to one another. However, in terms of their width, they are dimensioned such that, in spite of displacement, a sufficient overlap region, in which the ferrofluid remains enclosed, is still obtained. That is to say, the ferrofluidic seal maintains its sealing property even when the rotor shaft 22 is raised.

In order to avoid the situation where, during the raising or lowering movement of the rotor shaft 22 or during operation, the two seal parts 39, 40 of the ferrofluidic seal touch one another on account of an axial displacement of the mounting 21, a spacer 47 is provided, via which the two seal parts 39, 40 are kept apart from one another. This spacer 47 is designed as a nonpositive bearing which allows rotation and is arranged in a stationary manner on the stator housing 29 and which includes a bearing ring 49 which is spring-loaded via compression springs 48 and which presses the two seal parts 39, 40 away from one another. Contact between the two seal parts is ruled out via this axial bearing.

The invention has been described in detail with particular reference to preferred embodiments thereof and examples, but it will be understood that variations and modifications can be effected within the spirit and scope of the invention.

What is claimed is:

1. A magnetic mounting of a rotor shaft relative to a stator, comprising:
    a first bearing part arranged fixedly in terms of rotation on the rotor shaft, including permanent-magnetic elements arranged next to one another and having flux guide elements arranged therebetween;
    a second bearing part provided on the stator, including a structure formed of superconductive high-$T_c$ material, said first and second bearing parts being separated by a bearing gap; and
    sealing means for providing a seal of the bearing gap against penetration of ambient air and for allowing movement of said first bearing part with respect to said second bearing part in a direction substantially perpendicular to the bearing gap while maintaining the seal;
    wherein said sealing means comprises annular sealing elements which seal off in relation to one of the rotor shaft and said first bearing part;
    wherein the stator is disposed inside a stator housing, and
    wherein the annular sealing elements are held on the stator housing at a portion having sufficient elasticity.

2. A magnetic mounting of a rotor shaft relative to a stator, comprising:
    a first bearing part arranged fixedly in terms of rotation on the rotor shaft, including permanent-magnetic elements arranged next to one another and having flux guide elements arranged therebetween;
    a second bearing part provided on the stator, including a structure formed of superconductive high-$T_c$ material, said first and second bearing parts being separated by a bearing gap; and
    sealing means for providing a seal of the bearing gap against penetration of ambient air and for allowing movement of said first bearing part with respect to said second bearing part in a direction substantially perpendicular to the bearing gap while maintaining the seal;
    wherein said sealing means comprises annular sealing elements which seal off in relation to one of the rotor shaft and said first bearing part;
    wherein the stator is disposed inside a stator housing, and
    wherein the annular sealing elements are held on the stator housing at a portion having sufficient elasticity;
    wherein the annular sealing elements have a sufficient intrinsic elasticity allowing the movement of said first bearing part with respect to said second bearing part.

3. A magnetic mounting of a rotor shaft relative to a stator, comprising:
    a first bearing part arranged fixedly in terms of rotation on the rotor shaft, including permanent-magnetic elements arranged next to one another and having flux guide elements arranged therebetween;
    a second bearing part provided on the stator, including a structure formed of superconductive high-$T_c$ material, said first and second bearing parts being separated by a bearing gap; and
    sealing means for providing a seal of the bearing gap against penetration of ambient air and for allowing movement of said first bearing part with respect to said second bearing part in a direction substantially perpendicular to the bearing gap while maintaining the seal;
    wherein said sealing means comprises annular sealing elements which seal off in relation to one of the rotor shaft and said first bearing part;
    wherein the stator is disposed inside a stator housing,
    wherein the annular sealing elements are held on the stator housing at a portion having sufficient elasticity
    wherein said sealing means further include an elastic housing portion running essentially parallel to the rotor shaft on the stator housing on both sides of the bearing gap; and
    wherein said sealing elements include at least one of lamella sealing rings, labyrinth sealing rings, radial packing rings and at least one ferrofluidic seal.

4. The magnetic mounting as claimed in claim 3, wherein the elastic housing portion is designed in the form of a corrugated-tube or corrugated-hose portion.

5. The magnetic mounting as claimed in claim 4, further comprising at least one feed line for feeding a scavenging gas into the bearing gap.

6. A magnetic mounting of a rotor shaft relative to a stator, comprising:
    a first bearing part arranged fixedly in terms of rotation on the rotor shaft, including permanent-magnetic elements arranged next to one another and having flux guide elements arranged therebetween;
    a second bearing part provided on the stator, including a structure formed of superconductive high-$T_c$ material, said first and second bearing parts being separated by a bearing gap;
    sealing means for providing a seal of the bearing gap against penetration of ambient air and for allowing movement of said first bearing part with respect to said second bearing part while maintaining the seal; and
    further comprising at least one feed line for feeding a scavenging gas into the bearing gap;
    wherein said sealing means include annular sealing elements which seal off in relation to one of the rotor shaft and said first bearing part;
    wherein the stator is disposed inside a stator housing,
    wherein the annular sealing elements are held on the stator housing at a portion having sufficient elasticity;
    wherein said sealing means further include an elastic housing portion running essentially parallel to the rotor shaft on the stator housing on both sides of the bearing gap;
    wherein the elastic housing portion is designed in the form of a corrugated-tube or corrugated-hose portion;
    wherein said sealing elements include at least one of lamella sealing rings, labyrinth sealing rings, radial packing rings and at least one ferrofluidic seal;
    wherein a ferrofluidic seal has a first seal part, arranged on the stator, and a second seal part, arranged on the rotor-shaft, each seal part including an annular permanent-magnetic element with an associated annular flux guide element, with ferrofluid enclosed in an air gap between the flux guide elements located opposite one another, and
    wherein, upon movement of the rotor shaft with respect to the stator, the first and second seal parts are displaceable relative to one another, while maintaining enclosure of the ferrofluid.

7. The magnetic mounting as claimed in claim 6, wherein the permanent-magnetic elements and the flux guide elements of each of the first and second seal parts have substantially identical inside and outside diameters.

8. The magnetic mounting as claimed in claim 7, wherein the flux guide elements have an overlap area with a width which delimits the air gap such that during maximum displacement of the first and second seal parts in relation to one another, a minimum overlap ensuring enclosure of all of the ferrofluid remains.

9. The magnetic mounting as claimed in claim 8, wherein at least one spacer is provided, by which the first and second seal parts are spaced apart even during displacement.

10. The magnetic mounting as claimed in claim 9, wherein the spacer is a nonpositive bearing allowing a rotation of the two seal parts with respect to one another.

11. The magnetic mounting as claimed in claim 10, wherein the nonpositive bearing includes a bearing ring acted upon by a return force and to press the first and second seal parts away from one another.

12. A magnetic mounting of a rotor shaft relative to a stator, comprising:
   a first bearing part arranged fixedly in terms of rotation on the rotor shaft, including permanent-magnetic elements arranged next to one another and having flux guide elements arranged therebetween;
   a second bearing part provided on the stator, including a structure formed of superconductive high-$T_c$ material, said first and second bearing parts being separated by a bearing gap; and
   sealing elements to provide a seal of the bearing gap against penetration of ambient air and for allowing movement of said first bearing part with respect to said second bearing part in a direction substantially perpendicular to the bearing gap while maintaining the seal;
   wherein said sealing elements comprise annular sealing elements which seal off in relation to one of the rotor shaft and said first bearing part;
   wherein the stator is disposed inside a stator housing, and
   wherein the annular sealing elements are held on the stator housing at a portion having sufficient elasticity.

13. A magnetic mounting of a rotor shaft relative to a stator, comprising:
   a first bearing part arranged fixedly in terms of rotation on the rotor shaft, having permanent-magnetic elements arranged next to one another and having flux guide elements arranged therebetween;
   a second bearing part provided on the stator, having a structure formed of superconductive high-Tc material, said first and second bearing parts being separated by a bearing gap; and
   sealing elements to provide a seal of the bearing gap against penetration of ambient air and for allowing movement of said first bearing part with respect to said second bearing part in a direction substantially perpendicular to the bearing gap while maintaining the seal.

* * * * *